United States Patent
Litsche et al.

[11] Patent Number: 5,838,648
[45] Date of Patent: Nov. 17, 1998

[54] METHOD AND APPARATUS FOR SCANNING BARCODES

[75] Inventors: Mario Litsche, Backnang; Martin Landis, Stuttgart, both of Germany

[73] Assignee: Eastman Kodak Company, Rochester, N.Y.

[21] Appl. No.: 752,188

[22] Filed: Nov. 18, 1996

[30] Foreign Application Priority Data

Nov. 23, 1995 [DE] Germany .................. 195 43 656.3

[51] Int. Cl.[6] .................................................. G11B 5/09
[52] U.S. Cl. ........................................ 369/58; 235/464
[58] Field of Search ............................. 369/58; 235/464

[56] References Cited

U.S. PATENT DOCUMENTS 5,671,202  9/1997  Browstein et al. .................. 369/58

FOREIGN PATENT DOCUMENTS 0575893  6/1993  European Pat. Off. .
4342895  6/1994  Germany .
4331105  3/1995  Germany .

*Primary Examiner*—Harold Pitts
*Attorney, Agent, or Firm*—Raymond L. Owens

[57] ABSTRACT

The invention relates to a method and an apparatus for scanning barcodes. The apparatus includes a scanning device and a holding device for a flat object and the barcode is positioned on the flat object. The holding device is mounted on a movable carriage capable of movement along the X and the Y axes which includes separate carriages movable along the X axis and the Y axis respectively. The scanning device is fixed in a stationary position relative to the movable carriage. In addition to the carriages movable along the X and Y axes, there is also a carriage movable along the Z axis which does not move during the scanning process. A preferred variation of the invention uses a flat object having a central hole around which a circular barcode is concentrically positioned. The holding device is movable in such a way that the circular barcode is made to follow a circular path over the scanning device.

14 Claims, 4 Drawing Sheets

METHOD AND APPARATUS FOR SCANNING BARCODES

FIELD OF THE INVENTION

The invention relates to a method and an apparatus for scanning barcodes having a scanning device and a means of holding a flat object, the barcode being positioned on the flat object.

BACKGROUND OF THE INVENTION

EP-A-0 575 893 describes an apparatus for reading barcodes. It is equipped with an optical scanner which is moved relative to the barcode which is printed in a circle. The optical disc remains stationary during this process. In a second embodiment, a light-emitting diode is provided which transmits light down a fiber-optic cable. The fiber-optic cable is held by a support which can be rotated around an axis coinciding with the center of the stationary optical disc. The end of the fiber-optic cable is attached to the support at a radial separation from the axis of rotation equal to that of the barcode from the center of the optical disc. The support is rotated by a pulley driven by a V-section drive belt. Both of the embodiments of the apparatus described in the above patent specification require a complex arrangement in order to direct light onto the barcode being scanned.

DE-A-43 42 895 describes an automatic goods storage device for audio data storage media and in particular for CDs. For the purposes of identification, the audio data storage media are moved past a detection device, e.g. a barcode reader. The barcode reader is rigidly attached to the side of a frame so that it can read the barcode. The barcode reader, a linear scanner, scans the linear barcode in a horizontal direction when the audio data storage medium is moved past it in a carriage.

Another apparatus for reading data is disclosed in DE-A-43 31 105. The scanning device is again fixed in stationary position. The object with the linear barcode to be read moves in a straight line under the scanning device. The scanning device produces two scanning beams each of which is set at a specific angle to the lines of the barcode. In addition, the lines of incidence of the two scanning beams are at right angles to one another. Though describing a fixed scanning device in each case, the two apparatus described above are limited to scanning linear barcodes.

SUMMARY OF THE INVENTION

It is the object of the present invention to create an apparatus and a method for reading barcodes which provide a straightforward means of reading a barcode on a flat object without involving additional equipment.

The object is achieved in a method for scanning a barcode on a flat object by a scanning device, wherein a holding device secures a flat object, the holding device being attached to first and second carriages movable in two directions at right angles to one another comprising the steps of:

energizing a drive motor for moving one carriage in a first direction (X) and energizing another drive motor for moving the other carriage in a direction (Y) at right angles to the first direction (X) so as to move the barcode along a path corresponding to its orientation past the scanning device;

scanning the barcode by the scanning device;

decoding the scanned barcode;

transmitting the decoded barcode to a control unit; and terminating the decoding, scanning and motor energizing operations for moving the carriage in the two directions (X, Y) at right angles to one another.

The above object is attained by an apparatus on which the holding device is mounted on a carriage which is movable in two directions at right angles to one another and having a fixed scanning device which remains stationary in relation to the movable carriage during the scanning operation.

The advantage of the inventive apparatus is that the barcode is read by virtue of the existing capability of the carriage for movement along the X and Y axes. If the barcode were not scanned in this way then either the scanning device or the flat object would have to be rotated by an additional motor. The means for moving the flat objects includes a first carriage capable of movement along the X axis, a second carriage capable of movement along the Y axis and a third carriage capable of movement along the Z axis. As already mentioned above, the first and second carriages capable of movement along the X and Y axes, respectively, are used to move a flat object gripped firmly in a holding device in such a way that the barcode can be read by the scanning device. In the embodiment described herein, the flat object has a hole in the center around which a circular barcode is positioned concentrically with the hole. The holding device for the flat object is moved in the appropriate fashion so that the circular barcode describes a circular path over the scanning device.

The subject of the invention is described below with reference to the drawings.

DETAILED DESCRIPTION OF THE INVENTION

Figure 1:
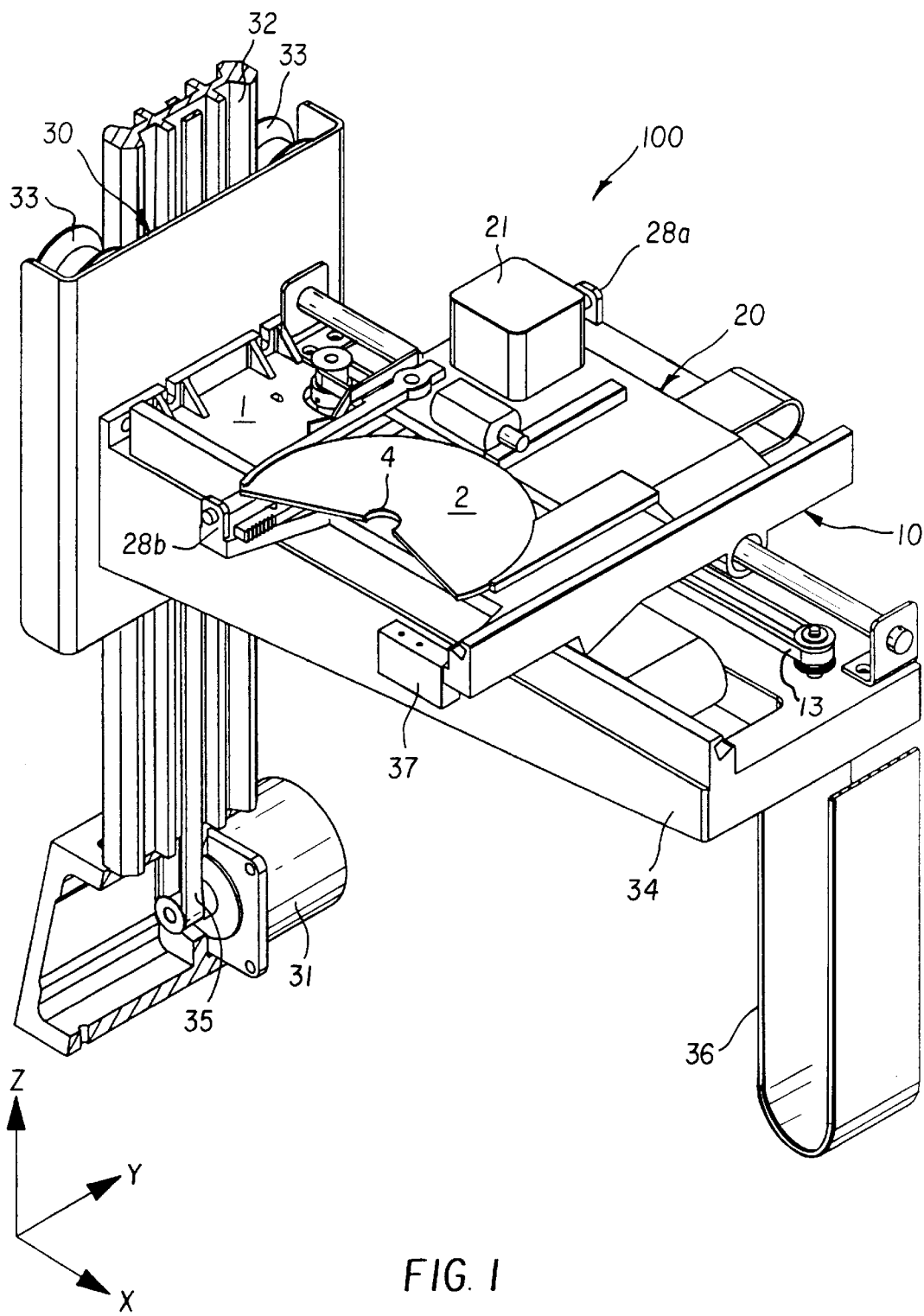
FIG. 1 is a schematic representation of the apparatus for scanning barcodes in a perspective and sectional cutaway view.

FIG. 1 shows a holding device 1 for a flat object 2. The flat object 2 is shown in this instance as a disc with a hole in the center. This representation of the object is by no means a prescriptive one since it is obvious to any skilled person that the device is capable of handling any flat object. Neither is the central hole 4 an essential requirement for the flat object. Using the method as described by the invention and the corresponding apparatus it is possible to handle any flat object on which a barcode is printed. The orientation and position of the barcode is only of secondary significance.

Figure 2:
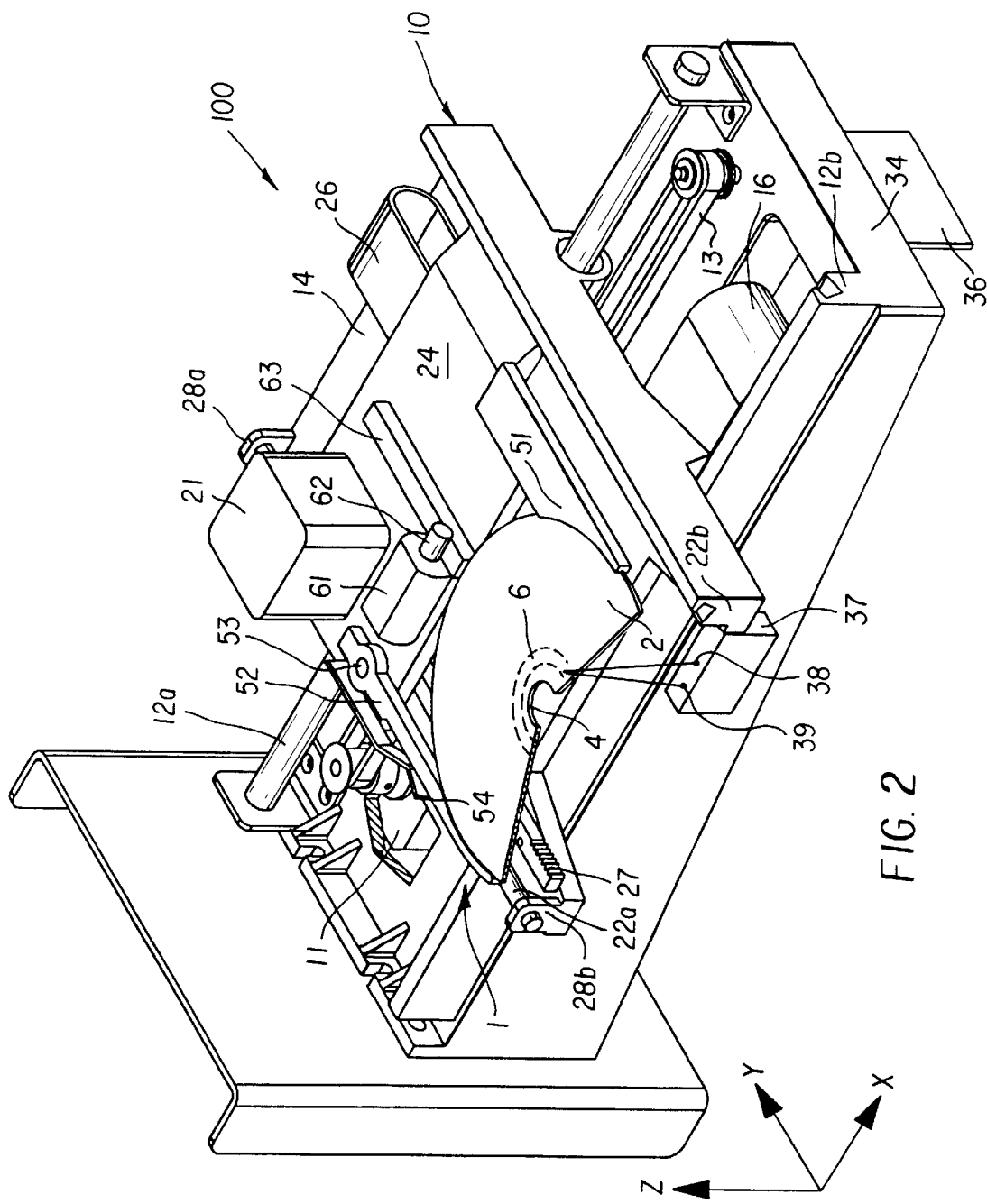
FIG. 2 is a detailed view of the apparatus shown in FIG. 1.

The description given below relates to a specific embodiment of the invention illustrated in detail in FIGS. 1 and 2. In this case the flat object 2 is a circular disc with a central hole 4 around which a circular barcode 6 is positioned concentrically with the disc. The holding device 1 is attached to a carriage 100 which is movable along the X axis, the Y axis and the Z axis. The ability of the carriage to move along the Z axis is not an essential characteristic of the present invention. The ability of the carriage to move along the Z axis merely permits the flat object 2 to be moved to a subsequent processing or ejection unit (not illustrated) located on a different level from that of the barcode reading position. The movable carriage 100 consists in this embodiment of a carriage 10 movable along the X axis, a carriage 20 movable along the Y axis and a carriage 30 movable along the Z axis. The carriage 20 movable along the Y axis carries the holding device 1. Each of the carriages 10, 20 and 30 has its own drive motor 11, 21 and 31 respectively. The arrangement of the individual carriages 10, 20 and 30 is entirely variable and the holding device can be attached to the movable carriage which is the most suitable according to the technicalities of the particular arrangement in question.

The movable carriage 100 is constructed in such a way that when the drive motor 31 for the carriage 30 movable along the Z axis is energized, that carriage 30 moves along a rail 32 upwards or downwards along the Z axis depending on the direction of rotation of the drive motor 31. The rotation of the drive motor 31 is transmitted to the carriage 30 by means of a toothed or flat drive belt 35. The carriage 30 carries an arm 34 extending along the X axis. On the carriage 30 there are several rollers 33 by means of which the carriage 30 travels along the rail. A flexible ribbon cable 36 containing a number of electric leads connects to sensor devices (not illustrated) required in order to determine the position of the carriage 30 movable along the Z axis. A scanning device 37 is attached in a fixed position in relation to the plane represented by the carriages 10 and 20 movable along the X and Y axes respectively. In the embodiment of the invention illustrated here, the scanning device 37 is rigidly attached to the arm 34 of the carriage 30 movable along the Z axis. That scanning device 37 could, for example, be a reflex sensor which emits light from an emitter 38 onto the barcode and receives the reflected light in a receiver 39.

On the arm 34 of the carriage movable along the Z axis there is a guide bar 12a and a bracing or anti-twisting support 12b extending in X-axis direction, along which the carriage 10 is movable back and forth along the X axis. Another flexible ribbon cable 16 containing electrical leads supplies the drive motor 11 and sensor devices (not illustrated) with the required electrical power. The rotation of the drive motor 11 is transferred to the carriage 10 by means of a toothed drive belt 13 thereby imparting to it a linear movement. The carriage 10 also has a table 14 on which the carriage 20 movable along the Y axis is positioned.

The carriage 20 movable along the Y axis also has a guide bar 22a and a bracing or anti-twisting support 22b. The guide bar 22a is held in two brackets 28a and 28b rigidly attached to the table 14. Furthermore, the guide bar 22a and the bracing support 22b parallel to it extend in Y-axis direction. A rectangular slider 24 joins the guide bar 22a and the bracing or anti-twisting support 22b opposite to it. A toothed rack 27 is also attached in the vicinity of the guide bar 22a. Attached to the rectangular carriage 24 there is also a drive motor 21 to whose spindle a cogwheel (not illustrated) is attached which engages with the toothed rack 27. When the drive motor 21 is energized, the rectangular plate 24 is moved backwards or forwards along the Y axis. A flexible ribbon cable 26 containing electrical leads also leads from the table 14 to the drive motor 21 and to sensor devices (not illustrated).

The holding device 1 for the flat object is attached to the rectangular plate 24. In the embodiment illustrated here, the holding device 1 includes two clamping arms 51 and 52. One of the clamping arms 51 or 52, for example clamping arm 51, is rigidly attached to the rectangular plate 24. The other clamping arm 52 can be swiveled around a fulcrum 53 and is forced inwards towards the fixed clamping arm 51 by the action of a spring 54. This applies a clamping force against the edge of the flat object 2 thereby holding the latter firmly in the holding device 1. It is obvious to a skilled person, however, that the holding device 1 might just as well consist of two movable clamping arms. Other designs of holding device are equally conceivable, such as a grip that holds the flat object 2 by its edge only.

On the rectangular plate there is also a motor 61 which acts in conjunction with a toothed rack 63 via a cogwheel 62. The toothed rack 63 can be moved backwards and forwards along the Y axis and is used to transfer the flat object 2 to the subsequent processing unit (not illustrated).

Figure 3:
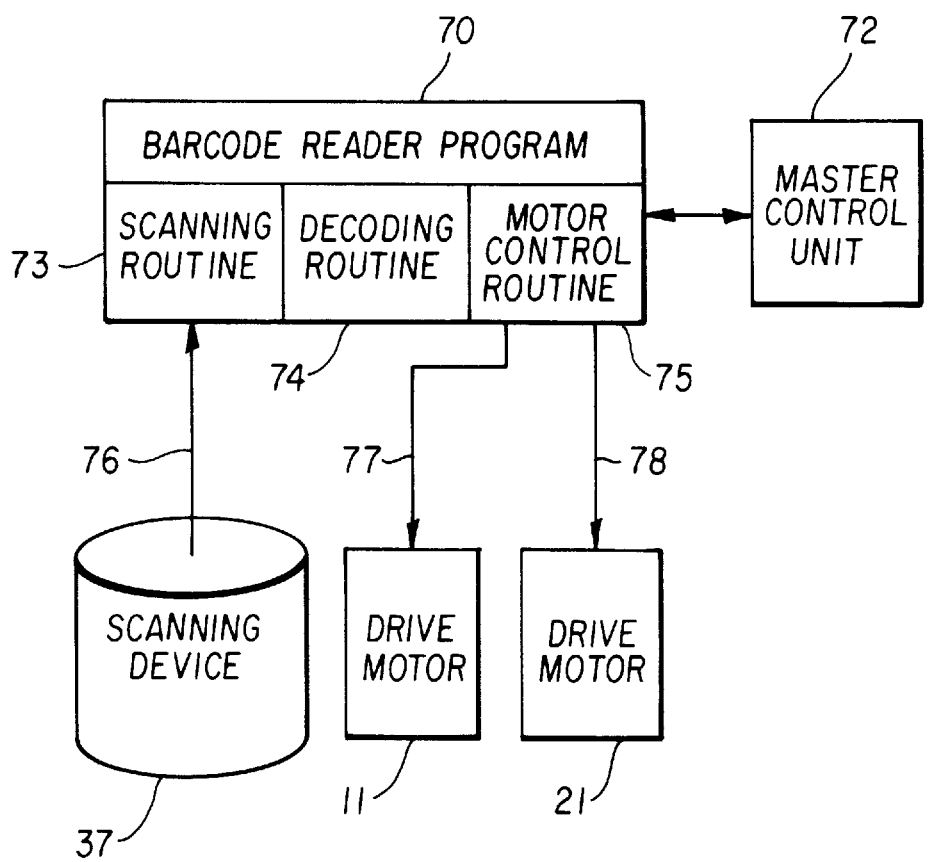
FIG. 3 is a block diagram of the system for reading a barcode on a flat object.

The flexible ribbon cables 16, 26 and 36 referred to above and containing electrical leads are connected to a control unit 70 which is responsible for controlling the scanning and decoding processes and the operation of the drive motors 11, 21 and 31 (see FIG. 3). The control unit 70 is connected to a master control unit 72. The master control unit 72 is used to control a combination of devices (not illustrated) of which the apparatus as described by the present invention forms a part. The control unit 70 contains a barcode reader program which is subdivided into a scanning routine 73, a decoding routine 74 and a drive motor control routine 75. The scanning device 37 transmits scanning signals via a cable 76 which are processed by the scanning routine 73 and then passed on to the decoding routine 74. The drive motor control routine 75 is linked by means of a first lead 77 to the drive motor 11 responsible for moving the carriage 10 along the X axis. A second lead 78 connects it to the drive motor 21 responsible for moving the carriage 20 along the Y axis.

Figure 4:
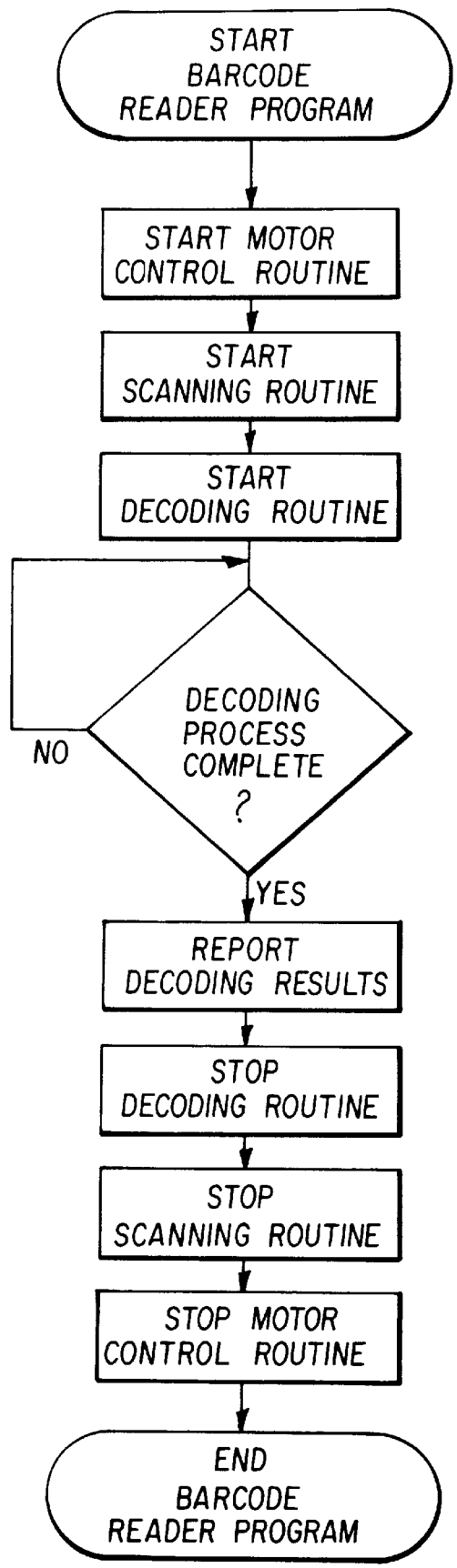
FIG. 4 is a flow chart for the method of controlling the apparatus for reading barcodes as described by the present invention.

FIG. 4 shows a flow chart for the process of controlling the operation of reading a circular barcode 6 on a flat object 2. At the beginning of the control process, the drive motor control routine, the scanning routine and the decoding routine are started. The drive motors 11 and 21 for the carriage 10 movable along the X axis and the carriage 20 movable along the Y axis respectively are energized as appropriate by the drive motor control routine in order to position the circular barcode 6 on the flat object 2 over the scanning device 37 and then to move the barcode past the scanning device. To that end, the drive motors 11 and 21 are energized in such a way that the flat object is moved in a circular path. The orientation of the barcode is not limited solely to circular barcodes. The apparatus as described by the present invention is capable of reading barcodes in any orientation. The drive motors 11 and 21 are then energized in such a way that the barcode is moved past the scanning device 37 in a continuous movement appropriate to its orientation.

While the circular barcode 6 is being moved past the scanning device 37, the scanning and decoding routines are started. The scanning process reads the continuous analogue signal transmitted by the scanning device 37. That analogue signal is then converted into a digital signal which is passed to the decoding routine. The decoding routine decodes the continuous scanning signal according to the rules of the barcode specification. This process continues until such time as a valid barcode is identified and decoded or until the program detects that the barcode contains errors or that no barcode is present. The results of the decoding operation are transmitted to the barcode reader program on the control unit 72. The control unit 72 passes that information on to the master control unit (not illustrated). Subsequently, the decoding routine, the scanning routine and the routine for controlling the drive motors 11 and 21 which move, respectively, the carriage 10 along the X axis and the carriage 20 along the Y axis are terminated. The flat object 2 is passed on for further processing according to the results of the barcode reading operation.

The present invention has been described with reference to a specific embodiment, the precise details of which may be modified by a person skilled in the art without materially altering the essential design for which patent protection is applied in the form of the claims below.

Parts List
1 Holding device
2 Flat object
4 Central hole
6 Barcode
10 Carriage movable along X axis
11 Drive motor for moving carriage along X axis
12*a* Guide bar
12*b* Bracing of anti-twisting support
13 Toothed drive belt
14 Table
16 Flexible ribbon cable
20 Carriage movable along Y axis
21 Drive motor for moving carriage along X axis
22*a* Guide bar
22*b* Bracing of anti-twisting support
24 Rectangular slider
26 Flexible ribbon cable
27 Toothed rack
28*a*, 28*b* Brackets
30 Carriage movable along Z
31 Drive motor for moving carriage along Z axis
32 Rail
33 Rollers
34 Arm
35 Toothed of flat drive belt
36 Flexible ribbon cable
37 Scanning device
38 Emitter of reflex sensor
39 Receiver of reflex sensor
51, 52 Clamping arms
53 Fulcrum
54 Spring
61 Motor
62 Cogwheel
63 Toothed rack
70 Control unit
72 Master control unit
73 Scanning routine
74 Decoding routine
75 Drive motor control process
76 Lead
77 First cable
78 Second cable
100 Carriage

We claim:

1. Method for scanning a barcode on a flat object by a scanning device, wherein a holding device secures a flat object, the holding device being attached to first and second carriages movable in two directions at right angles to one another comprising the steps of:

energizing a drive motor for moving one carriage in a first direction (X) and energizing another drive motor for moving the other carriage in a direction (Y) at right angles to the first direction (X) so as to move the barcode along a path corresponding to its orientation past the scanning device;

scanning the barcode by the scanning device;
decoding the scanned barcode;
transmitting the decoded barcode to a control unit; and
terminating the decoding, scanning and motor energizing operations for moving the carriage in the two directions (X, Y) at right angles to one another.

2. Method in accordance with claim 1, further including the step of determining that a valid barcode has been identified, the barcode contains errors or there is the absence of a barcode.

3. Method in accordance with claim 1, characterized in that the drive motors are energized in the appropriate manner in order to move the holding device in such a way that the barcode on the flat object is moved past the scanning device.

4. Method in accordance with claim 3, characterized in that the flat object has a central hole around which a circular barcode which is concentrically positioned and in that the drive motors are energized in the appropriate manner in order to move the holding device in such a way that the circular barcode on the flat object is moved past the scanning device.

5. Method in accordance with claim 1, characterized in that the flat object is a data storage medium in the form of a compact disc, a floppy disk or a gramophone record.

6. Apparatus for scanning a barcode having a scanning device and a holding device for a flat object, the barcode being positioned on the flat object, comprising:

a movable carriage; and
the holding device is attached to the movable carriage which is movable in two directions (X, Y) which are at right angles to one another and that the scanning device being fixed in a stationary position relative to the movable carriage during the scanning process.

7. Apparatus in accordance with claim 6, characterized in that the movable carriage is movable along the third axis (Z).

8. Apparatus in accordance with claim 7, characterized in that the movable carriage includes a first carriage movable along the X axis, a second carriage movable along the Y axis and a third carriage movable along the Z axis.

9. Apparatus in accordance with claim 8, characterized in that the scanning device is rigidly attached to the third carriage movable along the Z axis.

10. Apparatus in accordance with claim 9, characterized in that the holding device is connected to the second carriage movable along the Y axis.

11. Apparatus in accordance with claim 8, characterized in that the movement of the first and second carriages movable along the X and the Y axes is coordinated in such a way that a path is followed such that the barcode on the flat object held in the holding device is moved over the scanning device.

12. Apparatus in accordance with claim 1, characterized in that the flat object has a central hole around which a circular barcode is concentrically positioned and in that the movement of the carriages movable along the X and the Y axes is coordinated in such a way that a circular path is followed such that the barcode on the flat object held in the holding device is moved over the scanning device.

13. Apparatus in accordance with claim 6, characterized in that the scanning device is a reflex sensor.

14. Apparatus in accordance with claims 6 to 13, characterized in that the flat object is a data storage medium in the form of a compact disc, a floppy disk or a gramophone record.

* * * * *